United States Patent
Zheng

(10) Patent No.: US 9,496,765 B2
(45) Date of Patent: Nov. 15, 2016

(54) MOTOR AND VIBRATION REDUCTION SYSTEM FOR A MOTOR

(71) Applicant: Regal Beloit America, Inc., Beloit, WI (US)

(72) Inventor: Nengan Zheng, Troy, OH (US)

(73) Assignee: Regal Beloit America, Inc., Beloit, WI (US)

( * ) Notice: Subject to any disclaimer, the term of this patent is extended or adjusted under 35 U.S.C. 154(b) by 502 days.

(21) Appl. No.: 13/754,259

(22) Filed: Jan. 30, 2013

(65) Prior Publication Data

US 2013/0193784 A1 Aug. 1, 2013

Related U.S. Application Data

(60) Provisional application No. 61/592,465, filed on Jan. 30, 2012.

(51) Int. Cl.
*H02K 5/15* (2006.01)
*H02K 5/24* (2006.01)
*H02K 1/18* (2006.01)

(52) U.S. Cl.
CPC ............... *H02K 5/15* (2013.01); *H02K 1/185* (2013.01); *H02K 5/24* (2013.01)

(58) Field of Classification Search
CPC ............. H02K 1/18; H02K 5/24; H02K 5/15
USPC ........... 310/51, 89, 400, 402, 403, 407, 410, 310/411, 413, 427, 432, 216.114, 216.129, 310/216.113, 216.083, 216.118, 216.132, 310/216.133, 216.134, 216.136, 415, 310/216.127
See application file for complete search history.

(56) References Cited

U.S. PATENT DOCUMENTS

| | | | | |
|---|---|---|---|---|
| 1,822,096 A | | 9/1931 | Hollander | |
| 1,822,342 A | * | 9/1931 | Ehrlich | H02K 5/15 310/402 |
| 2,011,060 A | * | 8/1935 | Leland | H02K 1/185 310/216.135 |
| 2,040,371 A | * | 5/1936 | Gough | H02K 1/185 310/216.025 |

(Continued)

FOREIGN PATENT DOCUMENTS

CH 301165 8/1954

OTHER PUBLICATIONS

Search Report from the International Searching Authority for Application No. PCT/US2013/023845 dated Apr. 4, 2014 (4 pages).

(Continued)

*Primary Examiner* — John K Kim
*Assistant Examiner* — Noli Manaloto
(74) *Attorney, Agent, or Firm* — Michale Best & Friedrich LLP

(57) ABSTRACT

A motor includes a rotor supported for rotation about a longitudinal axis, a stator including a magnetic core, a first end plate positioned at a first end of the magnetic core, and a second end plate positioned at a second end of the magnetic core. The magnetic core, first end plate, and second end plate cooperate to define a central opening. The motor also includes a plurality of rods each fixedly attached to the first end plate and the second end plate and including a first end that extends along the longitudinal axis beyond the first end plate and a second end that extends along the longitudinal axis beyond the second end plate. A first support disk is coupled to the first end of each of the rods and a second support disk is coupled to the second end of each of the rods.

18 Claims, 5 Drawing Sheets

(56) References Cited

U.S. PATENT DOCUMENTS

| | | | |
|---|---|---|---|
| 2,523,520 A | 9/1950 | Reinhard | |
| 2,939,021 A * | 5/1960 | Gilchrist | H02K 1/185 310/216.133 |
| 3,395,296 A * | 7/1968 | Cohen | H02K 5/24 310/216.129 |
| 3,465,182 A * | 9/1969 | Church | H02K 5/24 310/51 |
| 4,894,573 A * | 1/1990 | Simpson | H02K 1/185 29/596 |
| 5,390,409 A | 2/1995 | Courtney | |
| 5,398,397 A | 3/1995 | Johnson | |
| 6,091,177 A | 7/2000 | Carbonell et al. | |
| 6,321,439 B1 * | 11/2001 | Berrong | H02K 1/185 264/272.2 |
| 6,346,760 B1 | 2/2002 | Boardman, IV | |
| 6,448,686 B1 | 9/2002 | Dawson et al. | |
| 6,498,417 B2 | 12/2002 | Fuller | |
| 6,628,027 B2 | 9/2003 | Fuller | |
| 6,713,930 B2 | 3/2004 | Shah et al. | |
| 6,720,699 B1 | 4/2004 | Shah et al. | |
| 6,766,572 B2 | 7/2004 | Dawson et al. | |
| 6,796,021 B2 | 9/2004 | Fuller | |
| 6,930,427 B2 * | 8/2005 | Grant | H02K 1/16 310/215 |
| 6,933,640 B2 | 8/2005 | Schurter et al. | |
| 7,166,948 B2 * | 1/2007 | Petersen | 310/179 |
| 7,353,586 B2 | 4/2008 | Majernik et al. | |
| 7,653,986 B2 | 2/2010 | Majernik et al. | |
| 7,923,890 B2 | 4/2011 | Boardman, IV et al. | |
| 7,946,028 B2 | 5/2011 | Majernik et al. | |
| 7,994,691 B2 | 8/2011 | George et al. | |
| 8,008,832 B2 | 8/2011 | Rhode | |
| 8,040,014 B2 | 10/2011 | Boardman, IV et al. | |
| 8,056,211 B2 | 11/2011 | Holmes et al. | |
| 2004/0061408 A1 * | 4/2004 | Grant | H02K 1/16 310/216.016 |
| 2008/0054751 A1 * | 3/2008 | Hoshino | H02K 15/022 310/216.114 |
| 2010/0295407 A1 | 11/2010 | Boardman, IV et al. | |
| 2010/0308687 A1 | 12/2010 | George et al. | |
| 2011/0074242 A1 * | 3/2011 | Singhal | H02K 1/22 310/216.058 |
| 2011/0121680 A1 | 5/2011 | Boardman, IV et al. | |

OTHER PUBLICATIONS

Written Opinion from the International Searching Authority for Application No. PCT/US2013/023845 dated Apr. 4, 2014 (6 pages).
Hydroelectric Generators, Product Brochure, Hyundai Ideal Electric Co., Mansfield, OH.

* cited by examiner

MOTOR AND VIBRATION REDUCTION SYSTEM FOR A MOTOR

RELATED APPLICATION DATA

This application claims priority to provisional application No. 61/592,465 filed Jan. 30, 2012, the entire contents of which are incorporated herein by reference.

BACKGROUND

The present invention relates to motors. More specifically, the present invention relates to electrically commutated motors supported in a housing.

SUMMARY

The present invention provides a motor that includes a rotor supported for rotation about a longitudinal axis, a stator including a magnetic core, a first end plate positioned at a first end of the magnetic core, and a second end plate positioned at a second end of the magnetic core. The magnetic core, the first end plate, and the second end plate cooperate to define a central opening. At least a portion of the rotor is disposed within the central opening. The motor also includes a plurality of rods. Each rod is fixedly attached to the first end plate and the second end plate and includes a first end that extends parallel to the longitudinal axis beyond the first end plate in a direction away from the magnetic core and a second end that extends parallel to the longitudinal axis beyond the second end plate in a direction away from the magnetic core. A first support disk is coupled to the first end of each of the plurality of rods such that the first support disk is spaced apart from the first end plate and a second support disk is coupled to the second end of each of the plurality of rods such that the second support disk is spaced apart from the second end plate.

In another construction, the invention provides a method of reducing vibration of a motor. The method includes supporting a rotor for rotation about a longitudinal axis, the rotor supported at a first end and a second end by an external housing. The method also includes selecting each of a plurality of rods, each of the rods having a length, a cross-sectional shape, a cross-sectional area, and a stiffness that define a natural frequency for each rod, each rod selected to have a desired natural frequency. The method further includes fixedly coupling each of the plurality of rods to a magnetic core of a stator such that a first end of each rod extends beyond the magnetic core and a second end of each rod extends beyond the magnetic core. The method also includes connecting a first support disk to the first ends of each of the rods, connecting a second support disk to the second ends of each of the rods, and engaging the first support disk, the second support disk and the external housing to support the magnetic core of the stator. The method further includes damping vibration of the motor by tuning the frequency of each of the plurality of rods to be different from the vibrational frequency of the magnetic core.

In still another construction, the invention provides a motor that includes a housing including an outer wall, a first end frame and a second end frame and a rotor supported by the first end frame and the second end frame for rotation about a longitudinal axis. A first support disk is coupled to the outer wall and the first end frame and a second support disk is coupled to the outer wall and the second end frame. A plurality of rods with each rod having a rod length measured between a first end fixedly attached to the first support disk and a second end fixedly attached to the second support disk. The outer wall inhibits radial movement of the first support disk and the second support disk with respect to the longitudinal axis and the first end frame and the second end frame cooperate to inhibit axial movement of the first support disk, the second support disk, and the plurality of rods along the longitudinal axis. A stator core surrounding a portion of the rotor and having a stator length measured between a first stator end and a second stator end, the rod length being about 1.1 to 2.5 times the stator length, the first stator end and the second stator end fixedly attached to each of the plurality of rods.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

The present invention provides a motor 10 that includes a support system that reduces the transmission of vibrations from the stator to the motor housing. FIGS. 1A-1E illustrate a stator core 15 for use with the invention, during the stator construction process, with FIG. 1A being the start of construction and FIG. 1E being the completed assembly. In the construction illustrated in FIG. 1A, a portion of the core 20 is illustrated as being formed from a stack of laminations. The portion of the core 20 defined by the laminations (or other arrangement) sometimes referred to as a magnetic core 20*a*. Preferably, electrical grade steel is employed to form the laminations and the number of laminations is selected to provide a desired length of the stator core 15. In other constructions, other materials or arrangements are employed to form the illustrated portion of the stator core 20 or magnetic core 20*a*. For example, powdered metal could be employed to form the portion of the core 20 or the portion of the core 20 could be machined from a single piece of material if desired.

Figure 1A:
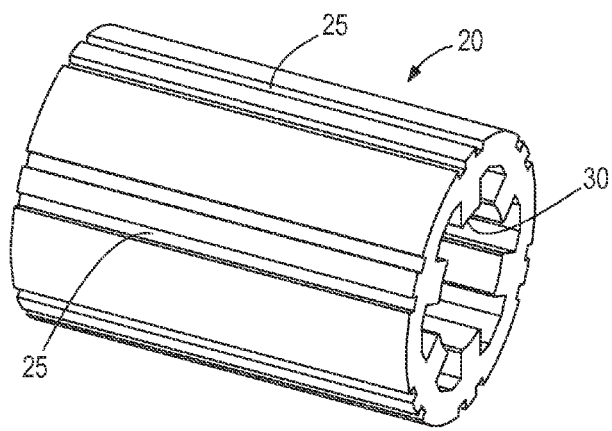
FIG. 1A is a perspective view of a portion of a stator core including longitudinal slots.

In the construction of FIG. 1A, the portion of the stator core 20 includes a plurality of longitudinally extending slots 25 on the exterior of the core 20. In addition, the core 20 includes six teeth 30 that extend radially inward. In other constructions, the slots 25 can be eliminated. In addition, the number of teeth 30 can vary as desired for the particular motor application.

Figure 1B:
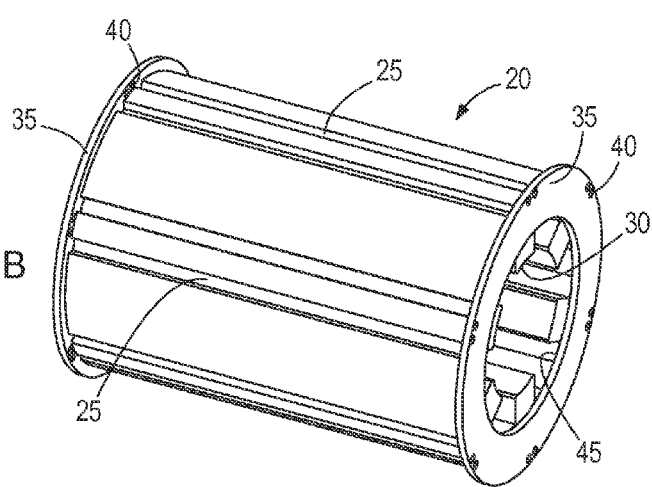
FIG. 1B is a perspective view of the portion of the stator core of FIG. 1a including end plates.

Turning to FIG. 1B, two annular end plates 35 are shown attached to the ends of the portion of the core 20 of magnetic core 20*a* formed in FIG. 1A. The end plates 35 have an outer diameter that is slightly larger than that of the portion of the stator core 20 and are fixed to the portion of the stator core 20 using the same methods that hold the various laminations together or other suitable methods. In preferred constructions, the end plates 35 include a plurality of apertures 40 or slots that extend axially through the plates 35. In constructions in which the portion of the stator core 20 includes longitudinal slots 25, the apertures 40 of the end plates 35 align with the slots 25. In the illustrated construction, the end plates 35 are annular and include a circular central opening 45. In still other constructions, the end plates 35 include teeth extending radially inward such that the end plates 35 are more similar to the laminations. In other constructions, the end plates 35 have the same diameter as the portion of the stator core 20 or even a slightly smaller diameter. In other constructions, the end plates 35 are formed as part of the portion of the stator core 20. For example, in constructions in which the core 20 is formed from a powdered metal, the end plates 35 can be formed as one unitary piece with the remainder of the core 20.

Figure 1C:
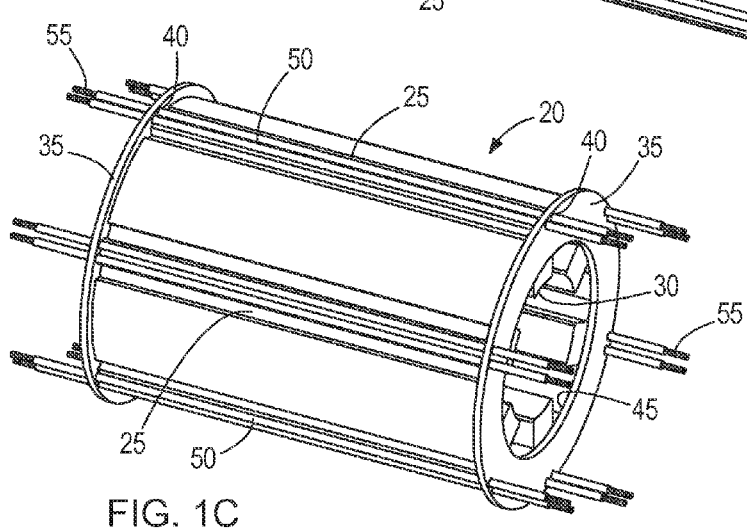
FIG. 1C is a perspective view of the portion of the stator core of FIG. 1b including a plurality of rods.

As illustrated in FIG. 1C, a number of rods 50 extend longitudinally around the outside of the portion of the stator core 20. The rods 50 pass through the apertures 40 in the end plates 35 and extend longitudinally beyond each end plate 35. In constructions of the portion of the stator 20 that include slots 25, at least a portion of the rods 50 are positioned within the slots 25. Each rod 50 is cylindrical and includes threads 55 on either end. The diameter of the rod 50, the length (effective length) of the rod 50, and the material of the rod 50 are selected to provide the desired dynamic characteristics as will be discussed. In some constructions, the rod 50 has a circular cross section with other constructions having other cross sectional shapes.

Figure 1D:
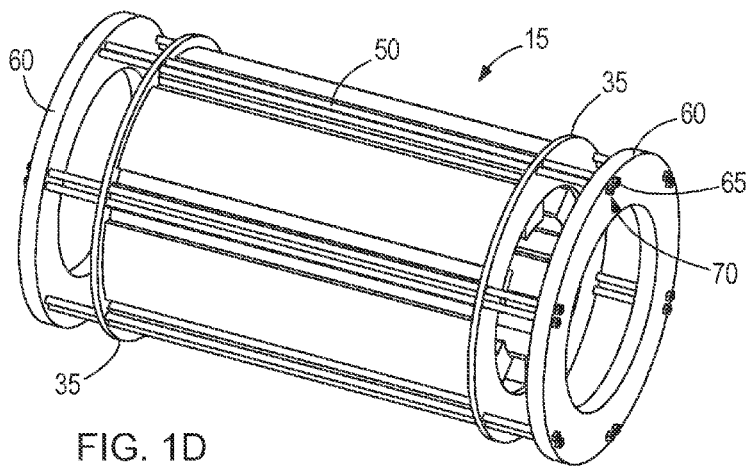
FIG. 1D is a perspective view of the portion of the stator core of FIG. 1c including support disks.

A pair of support disks 60 attach to the ends of the rods 50 as illustrated in FIG. 1D. In the illustrated construction, the support disks 60 are annular with other shapes being possible. The threaded ends 55 of the rods 50 pass through apertures 65 in the disk 60. Nuts 70 are then threaded onto the rods 50 to rigidly attach the rods 50 to the support disks 60. With the support disks 60 attached as illustrated in FIG. 1D, the stator core 15 is complete and is ready to receive windings.

Figure 6:
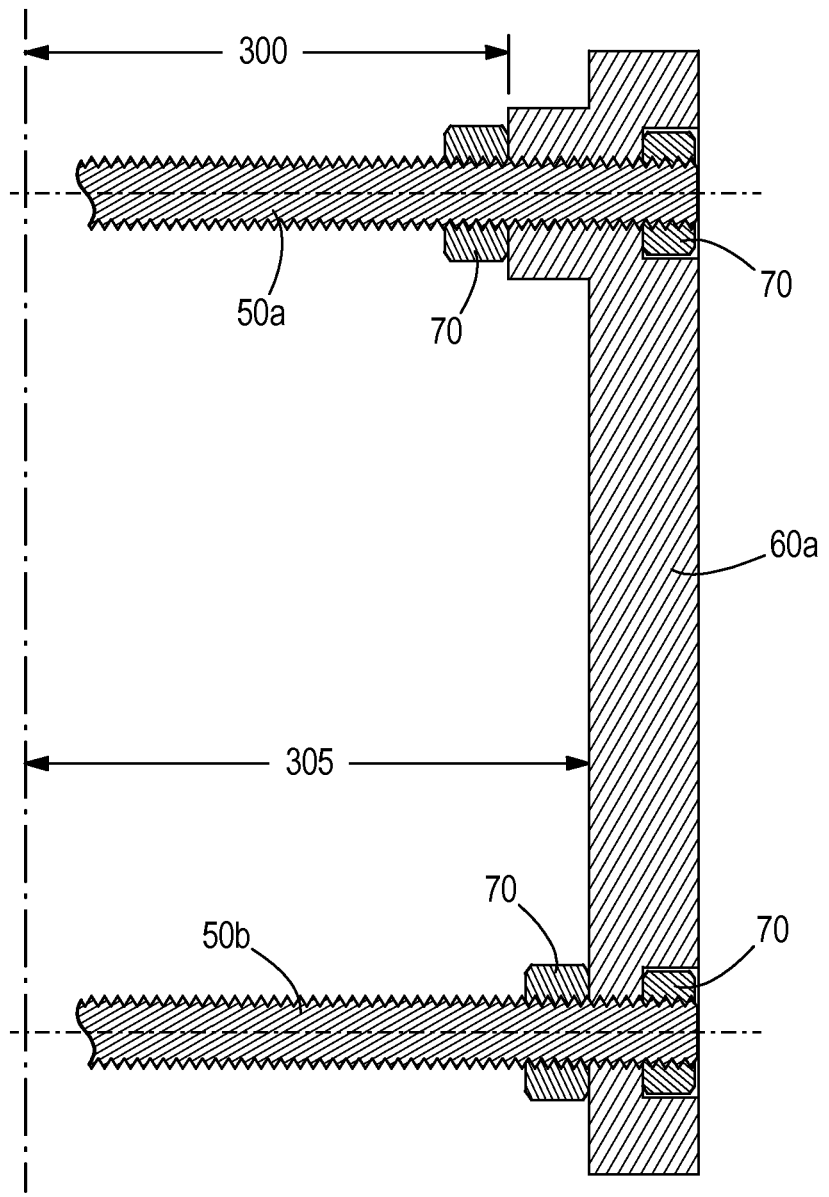
FIG. 6 is a cross-sectional view of a support disk taken along a central plane.

In some constructions such as the one shown in FIG. 6, the thickness of portions of one or both of the disks 60 is varied such that all of the rods 50 are not exactly the same length. In the construction of FIG. 6, each of the rods 50*a*, 50*b* is fixedly attached to the support disk 60*a* using two nuts 70. The effective length of the uppermost rod 50*a* is twice the length 300 while the length of the lowermost rod 50*b* is twice the length 305. As can be seen the thicker region of the support disk 60*a* adjacent the uppermost rod 50*a* when compared to the region adjacent the lowermost rod 50*b* results in an arrangement where the effective length of the lowermost rod 50*b* is longer than the uppermost rod 50*a*. It should be noted that the term "length" as used herein should be interpreted as the effective length when it relates to the rods 50, 50*a*, 50*b*. Thus, two rods having the same actual length can have a different effective length when attached to support disks 60*a* having varying thicknesses as illustrated in FIG. 6.

Figure 1E:
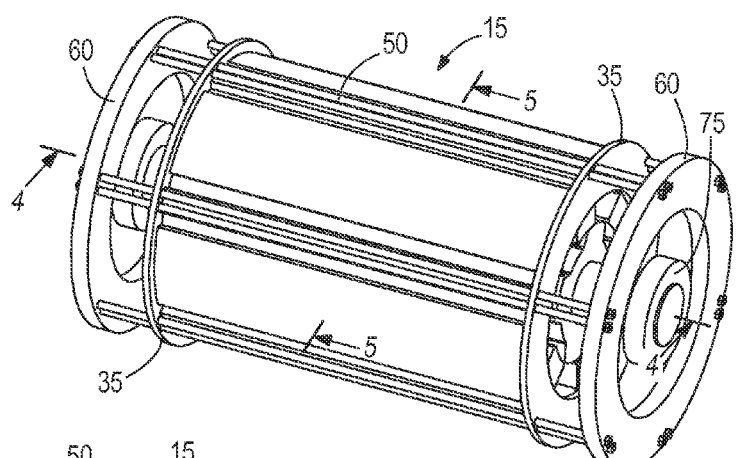
FIG. 1E is a perspective view of the stator core of FIG. 1d with a rotor positioned within the stator opening.
Figure 1F:
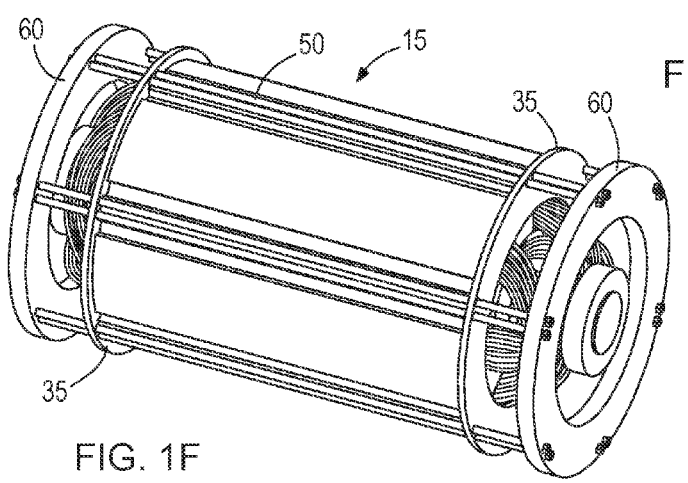
FIG. 1F is a photograph of the stator core of FIG. 1d.

FIG. 1E illustrates the stator core 15 of FIG. 1D with a rotor 75 positioned within the stator opening. FIG. 1F is a photograph of a completed stator core 15 including windings.

Figure 2:
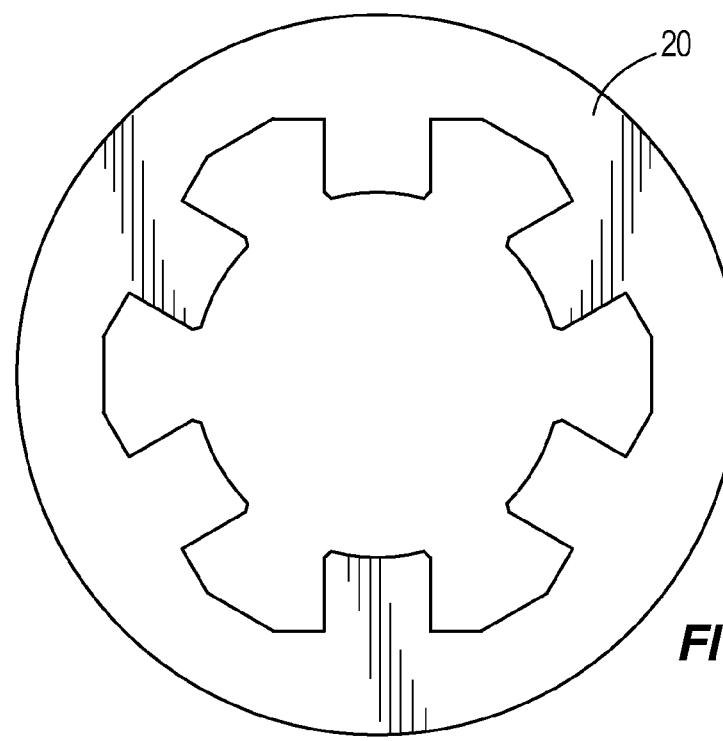
FIG. 2 is an end view of a first construction of a stator core.
Figure 3:
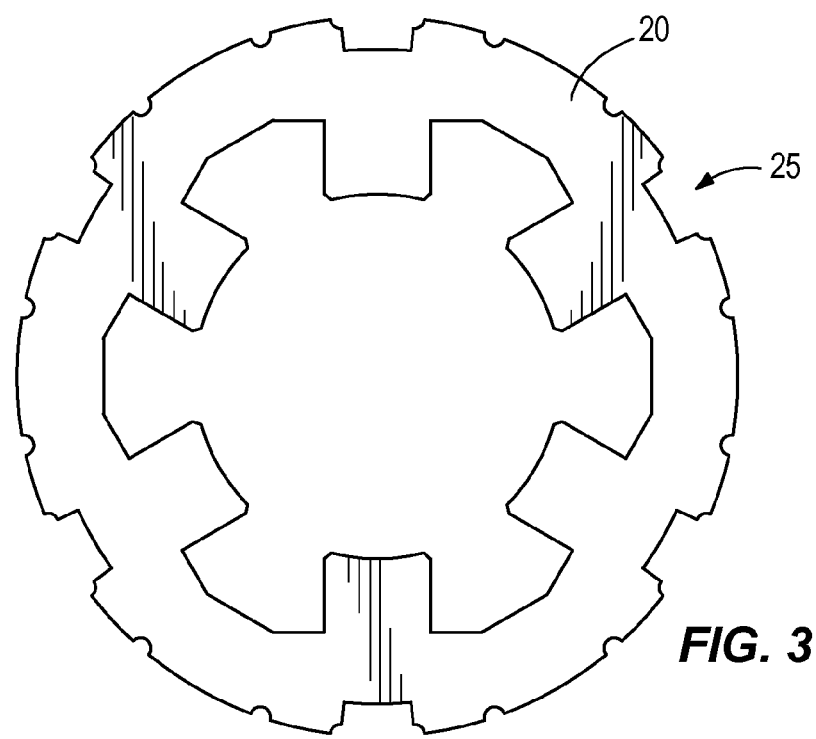
FIG. 3 is an end view of a second construction of a stator core.

To assemble the stator core 15 according to one embodiment of the invention, the user first stacks a plurality of laminations to define the portion of the core 20 or forms the portion of a core 20 from a unitary piece of material. If the construction being assembled does not include longitudinal slots 25, laminations or a unitary core piece having a cross section similar to that illustrated in FIG. 2 can be employed. In constructions in which the slots 25 are employed, laminations or a unitary core piece having a cross section such as that shown in FIG. 3 could be employed. The two end plates 35 are then attached to the portion of the core 20 using any suitable method (e.g., welding, adhesive, soldering, brazing, fasteners, etc.). The rods 50 are positioned within the apertures 40 of the end plates 35 such that they extend a desired distance in each direction (e.g., 1.1-2.5 times the stator core length). The rods 50 are then fixedly attached to the end plates 35 using any suitable method (e.g., welding, adhesive, soldering, brazing, fasteners, etc.).

Figure 4:
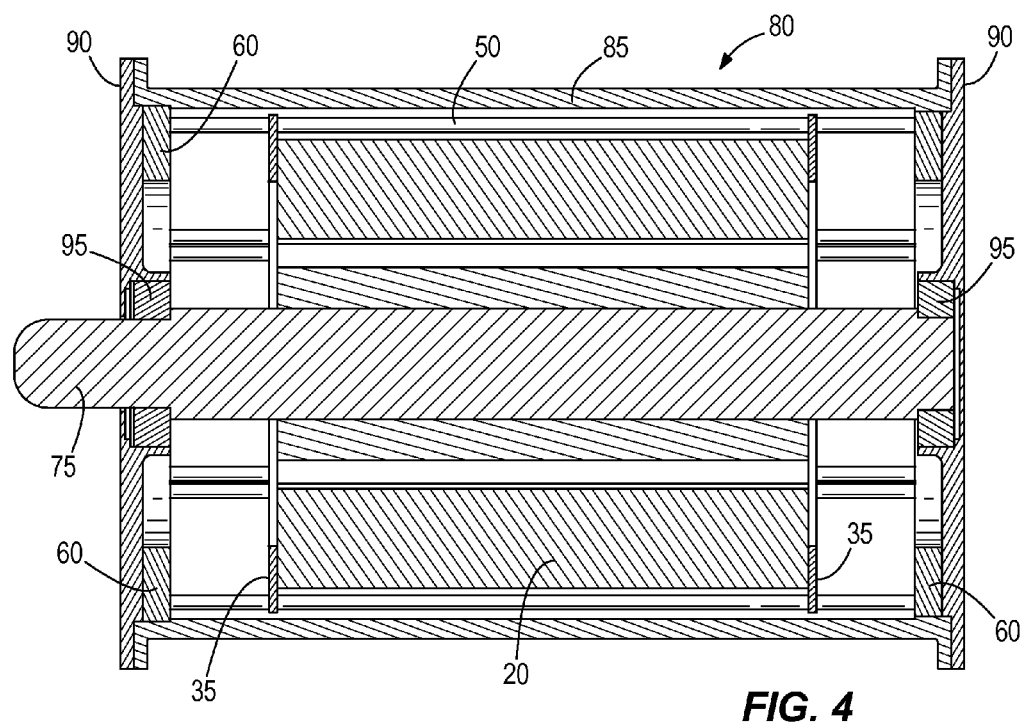
FIG. 4 is a longitudinal section view of the motor of FIG. 1e installed in a housing.
Figure 5:
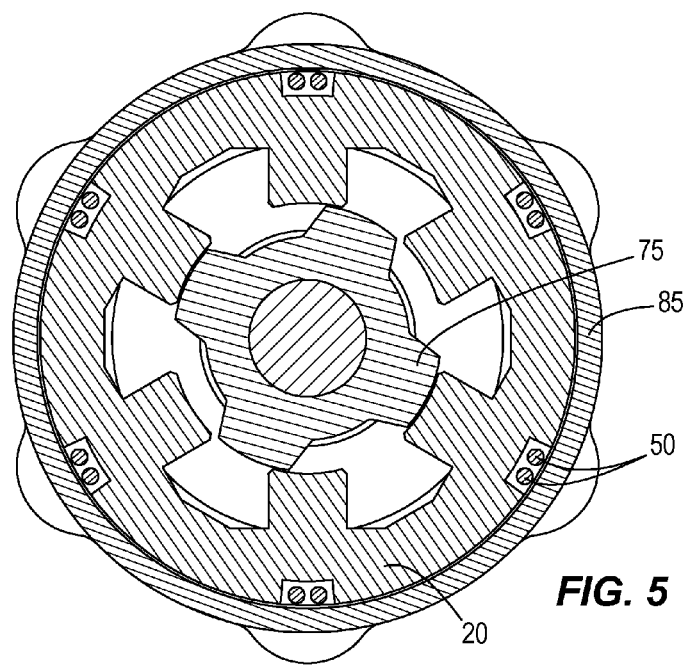
FIG. 5 is a section view of the motor of FIG. 1e installed in a housing and taken along a plane normal to the longitudinal axis.

Turning to FIG. 5 and continuing with the assembly, the stator core 15 is positioned within a housing 80. The illustrated housing 80 includes an outer wall 85 and two end frames 90 disposed at each end of the outer wall 85. The stator core 15 fits within the outer wall 85 with each of the support disks 60 in contact with one of the end frames 90 and the outer wall 85. Thus, the end frames 90 inhibit axial or longitudinal movement of the support disks 60 and the outer wall 85 inhibits radial movement of the support disks 60. The rods 50, the end plates 35, and the portion of the stator core 20 are each sized to provide clearance (see FIG. 4 and FIG. 5) with respect to the outer wall 85 of the housing 80. Thus, the support disks 60 are the only portions of the stator core 15 that are in direct contact with the housing 80. The housing 80 supports the support disks 60, which support the rods 50, which in turn support the portion of the stator core 20 and the windings. The rotor 75 is in turn supported within the stator opening by a pair of bearings 95 that are supported by the end frames 90.

The diameter, length, cross-sectional shape, and material used for the rods 50 are selected to support the stator core 15 and to dampen vibrations produced by the stator core 15 during operation. The rods 50, in essence, are tuned to a desired frequency to reduce the transmission of vibrations from the stator core 15 to the housing 80. By varying the length, the diameter, the shape, and/or the stiffness of the rods 50, a user can greatly reduce the vibrations transmitted to the housing 80. In some constructions, rods 50 having different characteristics are employed together to dampen vibrations at more than one frequency or across frequency ranges. For example, the support disks 60 can be formed to include steps at every other rod location. In this way, every other rod 50 will be a slightly different length and will therefore have a different natural frequency. The varying natural frequency will allow for the rods 50 to dampen different vibrations. Similarly, the diameter, or shape of the rods 50 could be varied to achieve similar results.

It should be noted that FIG. 5 illustrates a switched reluctance motor 10 having a six pole stator 15 and a four pole rotor 75. However, the invention described herein could be applied to motors having stators with more or fewer poles, rotors having more or fewer poles or motors other than switched reluctance motors.

What is claimed is:

1. A motor comprising:
   a rotor supported for rotation about a longitudinal axis;
   a stator including a magnetic core having a plurality of laminations stacked along the longitudinal axis;
   a first end plate positioned at a first end of the magnetic core;
   a second end plate positioned at a second end of the magnetic core, the magnetic core, the first end plate, and the second end plate cooperating to define a central opening, at least a portion of the rotor disposed within the central opening;
   a plurality of rods, each rod movable with respect to and spaced apart from each of the plurality of laminations and fixedly and directly attached to the first end plate and the second end plate and including a first end that extends parallel to the longitudinal axis beyond the first end plate in a direction away from the magnetic core and a second end that extends parallel to the longitudinal axis beyond the second end plate in a direction away from the magnetic core;
   a first support disk coupled to the first end of each of the plurality of rods such that the first support disk is spaced apart from the first end plate; and
   a second support disk coupled to the second end of each of the plurality of rods such that the second support disk is spaced apart from the second end plate.

2. The motor of claim 1, wherein the magnetic core includes a plurality of slots that extend along an outer portion of the magnetic core substantially parallel to the longitudinal axis, and wherein one of the plurality of rods is disposed at least partially within each of the plurality of slots.

3. The motor of claim 1, wherein each of the plurality of rods includes a length, a cross-sectional shape, a cross-sectional area, and a stiffness that cooperate to define a natural frequency.

4. The motor of claim 3, wherein the length of each rod is between 1.1 and 2.5 times a length of the magnetic core measured along the longitudinal axis.

5. The motor of claim 3, wherein the length, the cross-sectional shape, the cross-sectional area, and the stiffness of each rod are selected such that the natural frequency of the rod is different from a vibrational frequency of the magnetic core to dampen vibration of the motor.

6. The motor of claim 3, wherein the length of one of the plurality of rods is different from the length of another of the plurality of rods.

7. The motor of claim 6, wherein the first support disk includes a plurality of apertures each sized to receive one of the rods, and wherein the first support disk defines a first thickness adjacent one of the apertures and a second thickness adjacent a second one of the apertures, the second thickness being different than the first thickness.

8. The motor of claim 1, further comprising an external housing positioned to support the rotor and the magnetic core, the external housing including an outer wall, a first end frame, and a second end frame.

9. The motor of claim 8, wherein the first support disk engages the first end frame and the outer wall and the second support disk engages the second end frame and the outer wall to completely support the magnetic core.

10. The motor of claim 9, wherein a connection between the first support disk, the second support disk, the first end frame, the second end frame, and the outer wall are the sole connections between the exterior housing and the magnetic core.

11. A method of reducing vibration of a motor, the method comprising:
    supporting a rotor for rotation about a longitudinal axis, the rotor supported at a first end and a second end by an external housing;
    selecting each of a plurality of rods, each of the rods having a length, a cross-sectional shape, a cross-sectional area, and a stiffness that define a natural frequency for each rod, each rod selected to have a desired natural frequency, wherein at least one of the plurality of rods is tuned to a natural frequency that is different than at least one other of the plurality of rods;
    fixedly and directly coupling each of the plurality of rods to each end of a magnetic core of a stator such that a first end of each rod extends beyond the magnetic core and a second end of each rod extends beyond the magnetic core;
    connecting a first support disk to the first ends of each of the rods;
    connecting a second support disk to the second ends of each of the rods;
    engaging the first support disk, the second support disk and the external housing to support the magnetic core of the stator; and
    damping vibration of the motor by tuning the frequency of each of the plurality of rods individually to be different from the vibrational frequency of the magnetic core.

12. The method of claim 11, wherein fixedly coupling each of the plurality of rods to the magnetic core of the stator includes welding each rod to a first end plate and a second end plate and attaching the first end plate and the second end plate to the magnetic core.

13. The method of claim 11, wherein selecting each of the plurality of rods includes selecting a first rod having a first length and selecting a second rod having a second length different from the first length.

14. The method of claim 13, wherein connecting the first support disk to the first ends of each of the rods includes connecting the first rod to the first support disk in a region where the first support disk has a first thickness and connecting the second rod to the first support disk in a region where the first support disk has a second thickness different than the first thickness.

15. A motor comprising:
    a housing including an outer wall, a first end frame and a second end frame;
    a rotor supported by the first end frame and the second end frame for rotation about a longitudinal axis;
    a first support disk coupled to the outer wall and the first end frame;
    a second support disk coupled to the outer wall and the second end frame;
    a plurality of rods, each rod having a rod length measured between a first end fixedly attached to the first support disk and a second end fixedly attached to the second support disk, the outer wall inhibiting radial movement of the first support disk and the second support disk with respect to the longitudinal axis and the first end frame and the second end frame cooperating to inhibit axial movement of the first support disk, the second support disk, and the plurality of rods along the longitudinal axis; and a stator core including a plurality of laminations, a first end plate at a first end of the plurality of laminations, and a second end plate at a second end of the plurality of laminations, the plurality of laminations, the first end plate, and the second end plate surrounding a portion of the rotor and having a stator length measured between the first end plate and the second end plate, the rod length being about 1.1 to 2.5 times the stator length, the first end plate and the second end plate fixedly and directly attached to each of the plurality of rods, and each of the plurality of laminations being separate from each of the plurality of rods.

16. The motor of claim 15, wherein the rods are the sole supporting connection between the stator core and the first support disk, the second support disk, and the outer wall.

17. The motor of claim 15, wherein one of the plurality of rods has a first rod length and a second of the plurality of rods has a second rod length different from the first rod length.

18. The motor of claim 15, wherein each of the plurality of rods includes a cross-sectional profile and a thickness, and wherein the cross-sectional profile, the thickness, and the rod length are selected to provide a rod having a desired natural frequency that is different from a frequency of the stator core.

* * * * *